US011644081B2

(12) United States Patent
Fierro et al.

(10) Patent No.: US 11,644,081 B2
(45) Date of Patent: May 9, 2023

(54) VIBRATION ISOLATOR

(71) Applicant: Raytheon Company, Waltham, MA (US)

(72) Inventors: Emmanuel Fierro, McKinney, TX (US); Eric E-Lee Chang, McKinney, TX (US); Kirk A. Miller, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/454,500

(22) Filed: Nov. 11, 2021

(65) Prior Publication Data
US 2022/0235845 A1    Jul. 28, 2022

Related U.S. Application Data

(60) Provisional application No. 63/142,807, filed on Jan. 28, 2021.

(51) Int. Cl.
*F16F 15/04* (2006.01)
*F16F 15/02* (2006.01)

(52) U.S. Cl.
CPC .......... *F16F 15/046* (2013.01); *F16F 15/022* (2013.01)

(58) Field of Classification Search
CPC ......... F16F 15/046; F16F 15/022; F16F 15/08
See application file for complete search history.

(56) References Cited

U.S. PATENT DOCUMENTS

| 5,370,352 | A | * | 12/1994 | Platus | F16F 15/073 |
| | | | | | 248/619 |
| 6,131,461 | A | * | 10/2000 | Leist | G01M 7/04 |
| | | | | | 73/662 |
| 6,543,955 | B2 | * | 4/2003 | Conaway | B61F 3/06 |
| | | | | | 105/220 |
| 9,348,197 | B2 | * | 5/2016 | Lewis | F16M 13/02 |
| 10,125,843 | B2 | * | 11/2018 | Runge | F16F 15/073 |
| 10,816,056 | B2 | * | 10/2020 | Chang | B64D 47/08 |
| 2015/0176752 | A1 | * | 6/2015 | Lewis | F16F 15/04 |
| | | | | | 248/560 |
| 2019/0162268 | A1 | * | 5/2019 | Chang | F16F 1/024 |

OTHER PUBLICATIONS

Pending claims of co-pending U.S. Appl. No. 17/326,615, filed May 21, 2021.

* cited by examiner

*Primary Examiner* — Thomas W Irvin
(74) *Attorney, Agent, or Firm* — Renner, Otto, Boisselle & Sklar, LLP (57) ABSTRACT

A vibration isolator, system, and method for minimizing propagation of vibrations between structures are configured to decouple axial and lateral structural modes. The vibration isolator includes an axial flexural support that provides axial compliance relative to a central axis and a lateral elastomeric support that provides lateral compliance relative to the central axis. The axial flexural support and the lateral elastomeric support provide stiffness about the central axis. The vibration isolator includes a first mount coupled to a first external structure and a second mount coupled to a second external structure. The axial flexural support is coupled to the first mount and the lateral elastomeric support is coupled to the second mount and the axial flexural support. Using an axial flexural support and a lateral elastomeric support enables tuning of the structural modes in one axis while minimizing the effects to the structural modes in the orthogonal axes.

20 Claims, 5 Drawing Sheets

```
┌─────────────────────────────────────┐
│ COUPLING AXIAL FLEXURAL SUPPORT TO  │
│      FIRST EXTERNAL STRUCTURE       │
│                 360                 │
└─────────────────────────────────────┘
                  ↓
┌─────────────────────────────────────┐
│ PROVIDING AXIAL COMPLIANCE VIA AXIAL│
│          FLEXURAL SUPPORT           │
│                 370                 │
└─────────────────────────────────────┘
                  ↓
┌─────────────────────────────────────┐
│      COUPLING LATERAL ELASTOMERIC   │
│      SUPPORT TO SECOND EXTERNAL     │
│     STRUCTURE AND AXIAL FLEXURAL    │
│               SUPPORT               │
│                 380                 │
└─────────────────────────────────────┘
                  ↓
┌─────────────────────────────────────┐
│   PROVIDING LATERAL COMPLIANCE VIA  │
│     LATERAL ELASTOMERIC SUPPORT     │
│                 390                 │
└─────────────────────────────────────┘
                  ↓
┌─────────────────────────────────────┐
│    INDEPENDENTLY TUNING AXIAL AND   │
│      LATERAL STRUCTURAL MODES       │
│                 400                 │
└─────────────────────────────────────┘
```

*FIG. 5*

VIBRATION ISOLATOR

RELATED APPLICATIONS

This application claims priority of U.S. Application No. 63/142,807, filed Jan. 28, 2021, the entire disclosure of which is hereby incorporated by reference.

FIELD OF DISCLOSURE

The disclosure relates to a vibration isolator that is arranged between external structures to minimize the propagation of vibrations between the external structures.

DESCRIPTION OF THE RELATED ART

Vibration isolation systems may be used in various applications to minimize the propagation of vibrations between external structures. In an exemplary application, a vibration isolation system may be used to isolate a vibration source from an external structure in the form of an optical system or optical element which may have its performance degraded by vibrations. The optical system may be supported on an aircraft and include a payload such as a camera or other optical sensor. The vibration isolator may be arranged between the optical system and the aircraft frame to prevent vibrations from the aircraft from being propagated to the optical system.

Prior vibration isolation systems have included various mechanisms such as elastomeric mechanisms, wire rope, hexapod, and flexure isolators to mitigate vibration and shock. The prior systems are deficient in that translational structural modes in three orthogonal directions are coupled to one another, such that the frequency of one structural mode cannot be changed without impacting the others. Using a pure flexure isolation mechanism may be suitable at low frequencies, but this approach has the disadvantage of standing waves creating problems at higher frequencies, such that the isolator does not act as a rigid body at high frequencies. Using a pure elastomeric isolation mechanism may mitigate issues at high frequencies, but this approach has issues at low frequencies, particularly when a structural mode in one axis, e.g., a vertical mode, must be lower or different than the modes in the orthogonal axes, e.g., lateral modes.

SUMMARY OF THE DISCLOSURE

The present application provides a vibration isolator, system, and method for minimizing propagation of vibrations between structures that decouples axial and lateral structural modes. The vibration isolator includes an axial flexural support that is configured to provide axial compliance relative to a central axis and a lateral elastomeric support that is configured to provide lateral compliance relative to the central axis. The axial flexural support and the lateral elastomeric support may be configured to provide stiffness about the central axis. Using both an axial flexural support and a lateral elastomeric support enables tuning of the structural modes in one axis while minimizing the effects to the structural modes in the orthogonal axes.

The vibration isolator may include a first mount that is configured to be coupled to a first external structure and a second mount configured to be coupled to a second external structure. In exemplary applications, the external structures may be an optical system and aircraft frame such that the vibration isolator prevents the propagation of vibrations from the aircraft frame to the optical system. When the vibration isolator is assembled, the axial flexural support is coupled to the first mount and the lateral elastomeric support is coupled to the second mount and the axial flexural support.

The axial flexural support may include one or more flexures or springs. The flexures may be formed as plates or flat rings that are axially offset along a central axis of the vibration isolator. The lateral elastomeric support includes one or more elastomeric structures that are arranged about the central axis. The elastomeric structures may be formed as cylindrical protrusions that extend in orthogonal directions relative to the central axis.

According to an aspect of the disclosure, a vibration isolator may include an axial flexural support and a lateral elastomeric support.

According to an aspect of the disclosure, a vibration isolator may enable axial and lateral structural modes to be decoupled from each other.

According to an aspect of the disclosure, a vibration isolator may include plate-like flexures and elastomeric protrusions that are arranged between two external structures.

According to an aspect of the disclosure, a method of minimizing propagations of vibrations between a first external structure and a second external structure arranged along a central axis may include independently tuning axial structural modes and lateral structural modes via an axial flexural support and lateral elastomeric support.

According to an aspect of the disclosure, a vibration isolator is configured to couple a first external structure and a second external structure arranged along a central axis to minimize propagation of vibrations between the first and second external structure, and the vibration isolator includes an axial flexural support that is configured to be coupled to the first external structure and provide axial compliance parallel to the central axis, and a lateral elastomeric support that is configured to be coupled to the second external structure and the axial flexural support, the lateral elastomeric support being configured to provide lateral compliance relative to the central axis, the axial flexural support and the lateral elastomeric support being configured to provide stiffness about the central axis, and axial structural modes and lateral structural modes that are independent and decoupled from each other.

According to an embodiment of any paragraph(s) of this summary, the axial flexural support may include at least one flexure.

According to an embodiment of any paragraph(s) of this summary, the axial flexural support may include at least one flexure that is planar and ring-shaped.

According to an embodiment of any paragraph(s) of this summary, the at least one flexure may include two or more parallel flexures that are offset along the central axis.

According to an embodiment of any paragraph(s) of this summary, the lateral elastomeric support may include at least one elastomeric structure.

According to an embodiment of any paragraph(s) of this summary, the at least one elastomeric structure may protrude along a longitudinal axis that is oriented orthogonal to the central axis.

According to an embodiment of any paragraph(s) of this summary, the at least one elastomeric structure may have a symmetrical shape.

According to an embodiment of any paragraph(s) of this summary, the at least one elastomeric structure may include a plurality of elastomeric structures that are arranged in a symmetrical pattern about the central axis.

According to an embodiment of any paragraph(s) of this summary, the vibration isolator may include an intermediate support that is arranged along the central axis and configured to couple the axial flexural support and the lateral elastomeric support to each another.

According to an embodiment of any paragraph(s) of this summary, the lateral elastomeric support may include a plurality of elastomeric protrusions that are disposed along an outer periphery of the intermediate support.

According to an embodiment of any paragraph(s) of this summary, the axial flexural support may include plate flexures, and the intermediate support and the plurality of elastomeric protrusions may be interposed between the plate flexures along the central axis.

According to an embodiment of any paragraph(s) of this summary, the intermediate support may include one or more elastomeric support interfaces that are configured to interface with the lateral elastomeric support, and one or more flexure support interfaces that are configured to interface with the axial flexural support.

According to an embodiment of any paragraph(s) of this summary, the lateral elastomeric support may be configured to provide lateral compliance in two lateral axes that are orthogonal to the central axis.

According to an embodiment of any paragraph(s) of this summary, the axial flexural support may be configured to provide lateral stiffness orthogonal to the central axis, and the lateral elastomeric support may be configured to provide axial stiffness parallel to the central axis.

According to an embodiment of any paragraph(s) of this summary, the vibration isolator may include a first mount configured to couple the first external structure and the axial flexural support, and a second mount configured to couple the second external structure and the lateral elastomeric support.

According to an embodiment of any paragraph(s) of this summary, the second mount may be configured as a housing configured to cover at least a portion of the axial flexural support and the lateral elastomeric support.

According to an embodiment of any paragraph(s) of this summary, the first mount may include one or more axial flexural support interfaces that are configured to interface with the axial flexural support, and the second mount may include one or more lateral elastomeric support interfaces that are configured to interface with the lateral elastomeric support.

According to another aspect of the disclosure, a vibration isolator system includes a first external structure arranged along a central axis, a second external structure arranged along the central axis, and a vibration isolator configured to couple the first external structure and the second external structure to minimize propagation of vibrations between the first and second external structure, with the vibration isolator including a first mount configured to be coupled to the first external structure, a second mount configured to be coupled to the second external structure, an axial flexural support that is configured to be coupled to the first mount and provide axial compliance parallel to the central axis, and a lateral elastomeric support that is configured to be coupled to a second mount and the axial flexural support, the lateral elastomeric support being configured to provide lateral compliance relative to the central axis, the axial flexural support and the lateral elastomeric support being configured to provide stiffness about the central axis, and axial structural modes and lateral structural modes that are independent and decoupled from each other.

According to an embodiment of any paragraph(s) of this summary, the first external structure may be a turret and the second external structure may be a support structure for the turret.

According to still another aspect of the disclosure, a method for minimizing propagations of vibrations between a first external structure and a second external structure arranged along a central axis includes coupling an axial flexural support to the first external structure, providing axial compliance via the axial flexural support in a direction that is parallel to the central axis, coupling a lateral elastomeric support to the second external structure and the axial flexural support, providing lateral compliance relative to the central axis via the lateral elastomeric support, the axial flexural support and the lateral elastomeric support being configured to provide stiffness about the central axis, and independently tuning axial structural modes and lateral structural modes via the axial flexural support and the lateral elastomeric support enabling the axial structural modes and the lateral structural modes to be decoupled from each other.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description of the disclosure when considered in conjunction with the drawings.

BRIEF DESCRIPTION OF DRAWINGS

The annexed drawings, which are not necessarily to scale, show various aspects of the disclosure.

DETAILED DESCRIPTION

The principles described herein have particular application in any application in which vibration occurs between components. Exemplary applications include moving platforms such as ground vehicles, water vehicles, aircraft, and space vehicles. The vibration isolator system described herein may be used to minimize the vibration propagation between two components on the moving platform. For example, one of the components may be an optical system or optical element, such as a turret supporting a payload, e.g., a camera or other optical sensor, and the other component may be a support structure for the optical system or element, such as a frame, e.g., an aircraft or space vehicle frame. In another exemplary applications, the vibration isolator system described herein may be implemented in a ground optical system that has a gimbal. Many other applications that require vibration isolation between components may be suitable.

Figure 1:
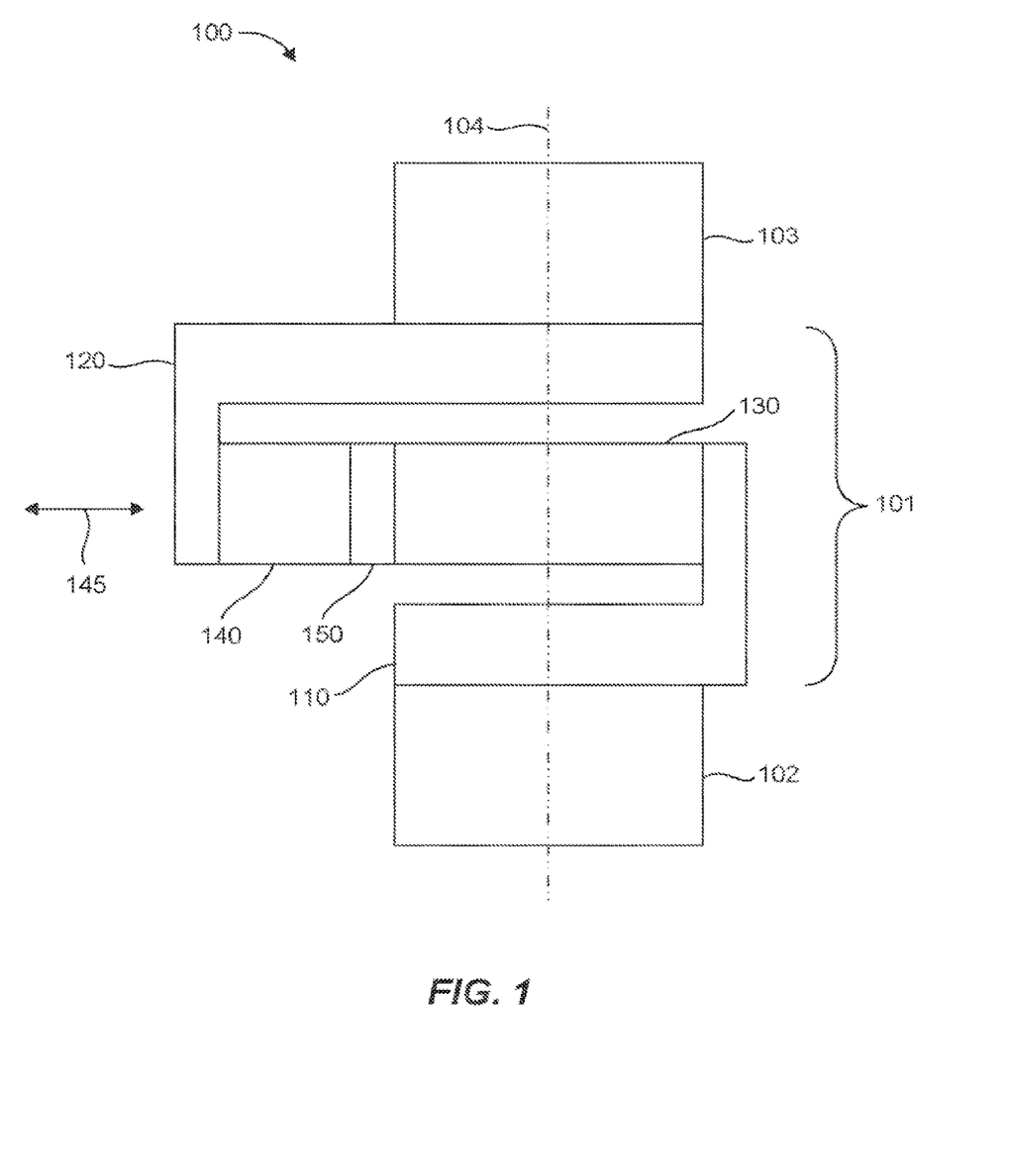
FIG. 1 is a schematic drawing showing a vibration isolator configured to couple a first external structure and a second external structure to minimize propagation of vibrations between the first and second external structure.

Referring first to FIG. 1, a schematic drawing of a vibration isolator system 100 is shown. The vibration isolator system 100 includes a vibration isolator 101, a first external structure 102, and a second external structure 103 that is configured to be coupled with the first external structure 102 via the vibration isolator 101. The first external structure 102 and the second external structure 103 are arranged along a central axis 104 of the vibration isolator system 100. In exemplary embodiments, the first external structure 102 and the second external structure 103 may be aligned along the central axis 104 and each external structure 102, 103 may be arranged symmetrically about the central axis 104. During assembly, the external structures 102, 103 may be coupled to each other along the central axis 104.

The vibration isolator 101 is arranged between the first external structure 102 and the second external structure 103 to couple the first and second external structures 102, 103 to each other and minimize propagation of vibrations therebetween. The first and second external structures 102, 103 may be any two components that are coupled together in the vibration isolator system 100 through which vibration can be propagated and transferred between the first and second external structures 102, 103. For example, the first external structure 102 may include an optical system, such as a turret supporting a payload that is in the form of a camera or other optical system, and the second external structure 103 may be a support structure for the optical system, such as an aircraft frame. The vibration isolator 101 may be used to prevent vibration transfer from the frame to the optical system.

The vibration isolator 101 includes a first mount 110 coupled to the first external structure 102 and a second mount 120 coupled to the second external structure 103. The mounts 110, 120 may be axially interposed between the first external structure 102 and the second external structure 103. The first mount 110 and the second mount 120 may be rigid bodies that are formed of a stiff or non-deformable material that may be dependent on the application. For example, a metal material may be suitable in an aircraft application.

An axial flexural support 130 is coupled to the first mount 110 and is configured to provide axial compliance for the vibration isolator 101 in a direction that is parallel to the central axis 104. The axial flexural support 130 may also be configured to provide lateral stiffness in a direction that is orthogonal to the central axis 104. In exemplary applications, the axial flexural support 130 includes at least one flexure or spring element. Any number of flexures or spring elements may be used and the number may be dependent on the application. The axial flexural support 130 may be arranged along the central axis 104 and axially interposed between the first mount 110 and the second mount 120. In exemplary embodiments, the axial flexural support 130 is arranged symmetrically about the central axis 104.

A lateral elastomeric support 140 is coupled to the second mount 120 and the axial flexural support 130. The lateral elastomeric support 140 is configured to provide lateral compliance relative to the central axis 104, such as in a direction 145 that is orthogonal to the central axis 104. The lateral elastomeric support 140 may be configured to provide axial stiffness in a direction that is parallel to the central axis 104. In exemplary embodiments, the lateral elastomeric support 140 may include one or more elastomeric structures. Any suitable elastomeric material may be used to form the elastomeric structures. Examples of suitable materials include polyurethane foam, nitrile, neoprene, natural rubber, and silicone compounds. Other elastomeric materials may also be suitable.

The vibration isolator 101 may include an intermediate support 150 that couples the axial flexural support 130 and the lateral elastomeric support 140 to each other. The intermediate support 150 may be any suitable rigid structure. In exemplary embodiments, the intermediate support 150 may couple the axial flexural support 130 and the lateral elastomeric support 140 in the orthogonal direction 145.

The vibration isolator system 100 including both the axial flexural support 130 and the lateral elastomeric support 140 is advantageous in that the supports provide a hybrid isolator approach in which the vibration isolator system 100 is independently tunable in different directions. The axial flexural support 130 enables tuning in an axial or vertical direction, such that tuning the lateral elastomeric support 140, e.g., by selecting and configuring the elastomeric members in a predetermined arrangement, may be less complex as compared with prior approaches which may exclusively use elastomeric members for tuning in three orthogonal directions. In the prior approaches, tuning one elastomeric member inherently impacts the other elastomeric members such that the structural modes in the axes are coupled to each other such that the frequency of one structural mode cannot be changed without impacting the others. In the vibration isolator system 100, the structural modes in the axial direction along the central axis 104 are decoupled from the lateral structural modes.

The axial flexural support 130 and the lateral elastomeric support 140 may be configured to provide stiffness about the central axis 104. For example, the axial flexural support 130 may be configured to provide translational compliance in the axial direction, i.e., in a direction that is parallel to the central axis 104, while maintaining rotational stiffness about the central axis 104. The lateral elastomeric support 140 may be configured to provide translational compliance in a lateral direction relative to the central axis 104, while maintaining rotational stiffness about the central axis 104. The axial flexural support 130 may be highly rigid in the lateral structural modes but may be tuned to lower the frequency in the axial direction by modifying the flexure thickness without affecting the overall lateral structural modes. The lateral structural modes may be tuned by modifying the lateral elastomeric support 140 without significantly affecting the axial structural modes.

In contrast to the vibration isolator system 100, in an all-elastomer approach, axial and lateral structural modes are highly coupled because the same type of isolator is used for both directions. Using an all-elastomer approach typically requires significant effort to tune the formula and/or geometry to achieve suitable performance and, in some cases, may not be feasible to achieve the desired results.

Using the axial flexural support 130 and the lateral elastomeric support 140 provides an additional way of tuning the frequency. This hybrid approach allows the lateral structural modes to be tuned first and then the axial stiffness may be changed by adding the axially softer flexures which are stiffer in the lateral direction. Because the elastomers are only used for lateral modes, the elastomer selection and arrangement may be easier than in the all-elastomer approach. The amount of allowable coupling of axial and lateral modes may be application specific. Using the hybrid elastomer and flexure approach disclosed herein, in an exemplary application, a lateral to stiffness ratio may be between about 2:1 and about 1:1, based upon the relative magnitudes of axial and lateral vibration.

The vibration isolator system 100 may be configured to handle frequencies of particular significance, such as resonant frequencies from the second external structure 103, e.g., an aircraft or other structure, or frequencies that may cause performance issues for the first external structure 102, e.g., an optical sensor or system. For example, random vibrations in the vibration isolator system 100 may degrade video resolution by exciting structural modes within a turret, causing image motion through displacements of optical elements. Isolating the turret by use of the vibration isolator system 100 may reduce the vibration levels at frequencies that will excite these structural modes. The vibration isolator system 100 may advantageously provide rotational stiffness, in contrast with other vibration isolation methods that are compliant in rotational degrees of freedom. Such compliance in rotational degrees of freedom is not desirable for gimbals that need mounting platforms with rotational stiffness. Such gimbals may not be sensitive to translational compliance, so the translational compliance that the vibration isolator system 100 provides may not degrade performance.

Figure 2A:
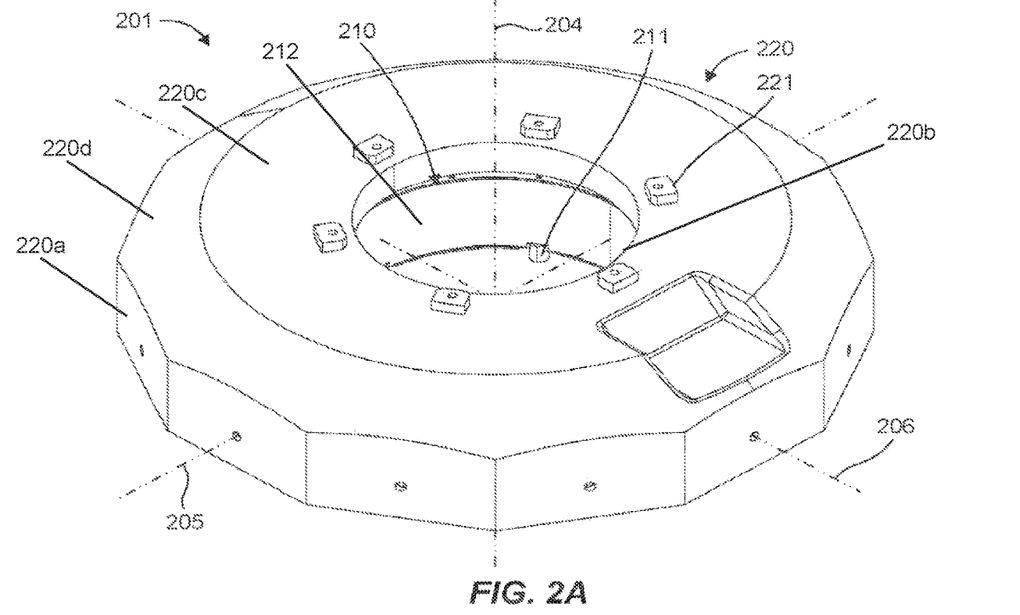
FIG. 2A is a top isometric view of a vibration isolator according to an exemplary embodiment in which the vibration isolator includes an axial flexural support and a lateral elastomeric support.

Referring now to FIGS. 2A-4, an exemplary vibration isolator 201 is shown. The vibration isolator 201 may be used in the vibration isolation system 100 of FIG. 1. As shown in FIG. 2A, the vibration isolator 201 is arranged along a central axis 204 and extends along axes 205, 206 that are orthogonal to the central axis 204 and each other. The axes 205, 206 may be arranged in a same plane that is perpendicular to a plane that extends in a direction perpendicular to the central axis 204.

The vibration isolator 201 includes a first mount 210 that is configured to be coupled to a first external structure, such as the first external structure 102 shown in FIG. 1. The first mount 210 may have any suitable shape and the shape may be dependent on the application and the external structures. For example, the first mount 210 may be cylindrical in shape or ring-shaped. In other exemplary embodiments, the first mount 210 may be rectangular. Many other shapes may be suitable. The first mount 210 may be arranged around the central axis 204 and may include any suitable mounting protrusion 211 configured to couple the first mount 210 to the external structure. Any number of mounting protrusions 211 may be provided and the mounting protrusions 211 may be arranged on an inner surface 212 of the first mount 210. The mounting protrusions 211 may be formed as a bracket, tab, hole, fastener, clasp, pin, snap element, clip, or any other suitable coupling mechanism that enables coupling between the first mount 210 and the external structure.

The vibration isolator 201 may also include a second mount 220 coupled to a second external structure, such as the second external structure 103 shown in FIG. 1. The second mount 220 may have any suitable shape which may be dependent on the external structure and application. The second mount 220 may be arranged around the central axis 204. In an exemplary embodiment, the second mount 220 may have a disc-like shape and extend along the axes 205, 204, such that a thickness of the second mount 220 extends in the axial direction. The thickness of the second mount 220 may be less than a length of the second mount 220 that extends perpendicular to the central axis 204.

The second mount 220 may define an outer peripheral surface 220a, an inner circumference 220b, and surfaces 220c, 220d that extend between the inner circumference 220b and the outer peripheral surface 220a. The first surface 220c may be planar and extend radially relative to the central axis 204. The second surface 220d may extend slightly axially and radially between the first surface 220c and the outer peripheral surface 220a. In an exemplary application in which the vibration isolator 201 is arranged vertically along the central axis 204, the second surface 220a may extend downwardly from the first surface 220c to the outer peripheral surface 220a.

The second mount 220 may include mounting protrusions 221 that are arranged on and extend from the second mount 220. The mounting protrusions 221 may be configured to facilitate coupling the second mount 220 to an external structure. The mounting protrusions 221 may have any suitable shape. A plurality of mounting protrusions 221 may be disposed along the first surface 220c proximate the inner circumference 220b. In exemplary embodiments, the plurality of mounting protrusions 221 may be arranged in a symmetric pattern about the central axis 204. The mounting protrusions 221 may be formed as a bracket, tab, hole, fastener, clasp, pin, snap element, clip, or any other suitable coupling mechanism that enables coupling between the second mount 220 and the external structure.

Figure 2B:
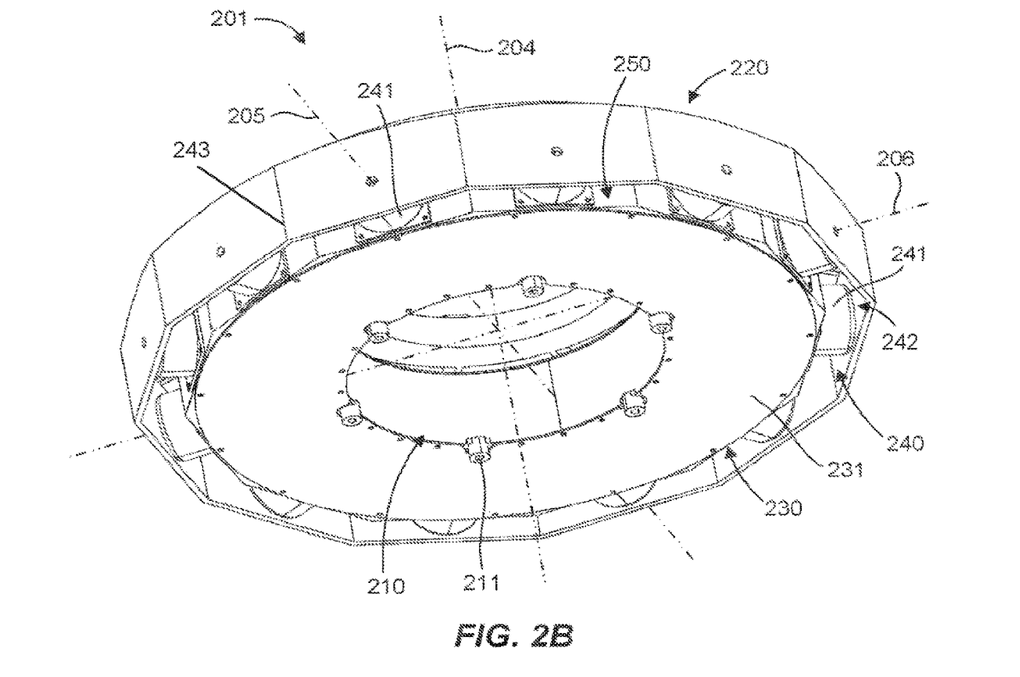
FIG. 2B is a bottom isometric view of the vibration isolator of FIG. 2A showing a flexure of the axial flexural support.

As shown in FIG. 2B, the vibration isolator 201 includes an axial flexural support 230 having at least one flexure 231 coupled to the first mount 210 and a lateral elastomeric support 240 coupled to the second mount 220 and the axial flexural support 230. The second mount 220 may be configured as a housing that covers at least a portion of the axial flexural support 230 and the lateral elastomeric support 240. The second mount 220 extends over and around the axial flexural support 230 and the lateral elastomeric support 240. In exemplary embodiments, the second mount 220 may completely cover the axial flexural support 230 and the lateral elastomeric support 240.

The elastomeric support 240 may include one or more elastomeric structures 241 that are formed of any suitable elastomeric material. The elastomeric structures 241 may be formed as radially-extending protrusions that extend radially outwardly relative to the central axis 204. Any number of elastomeric structures 241 may be provided and the number of elastomeric structures 241 may be dependent on the application. The elastomeric structures 241 may be arranged in a symmetrical pattern about the central axis 204.

A plurality of axial flexural support interfaces 242 are defined by the outer peripheral surface 220a of the second mount 220 and configured to interface with the elastomeric structures 241. The axial flexural support interfaces 242 may be planar panels that form a ring-like structure that surrounds the central axis 204, such that each axial flexural support interface 242 is adjacent another axial support interface 242 along a common edge 243. The planar panels may extend in directions that are parallel relative to the central axis 204. In other exemplary embodiments, the axial flexural support interfaces 242 may have other shapes.

The vibration isolator 201 may include an intermediate support 250 that couples the axial flexural support 230 and the lateral elastomeric support 240 to each other. The intermediate support 250 may be configured to support each of the elastomeric structures 241 such that the elastomeric structures 241 protrude radially outwardly from the intermediate support 250. The axial flexural support interfaces 242 may be configured to surround the intermediate support 250 such that the elastomeric structures 241 extend between the intermediate support 250 and the axial flexural support interfaces 242.

Figure 3:
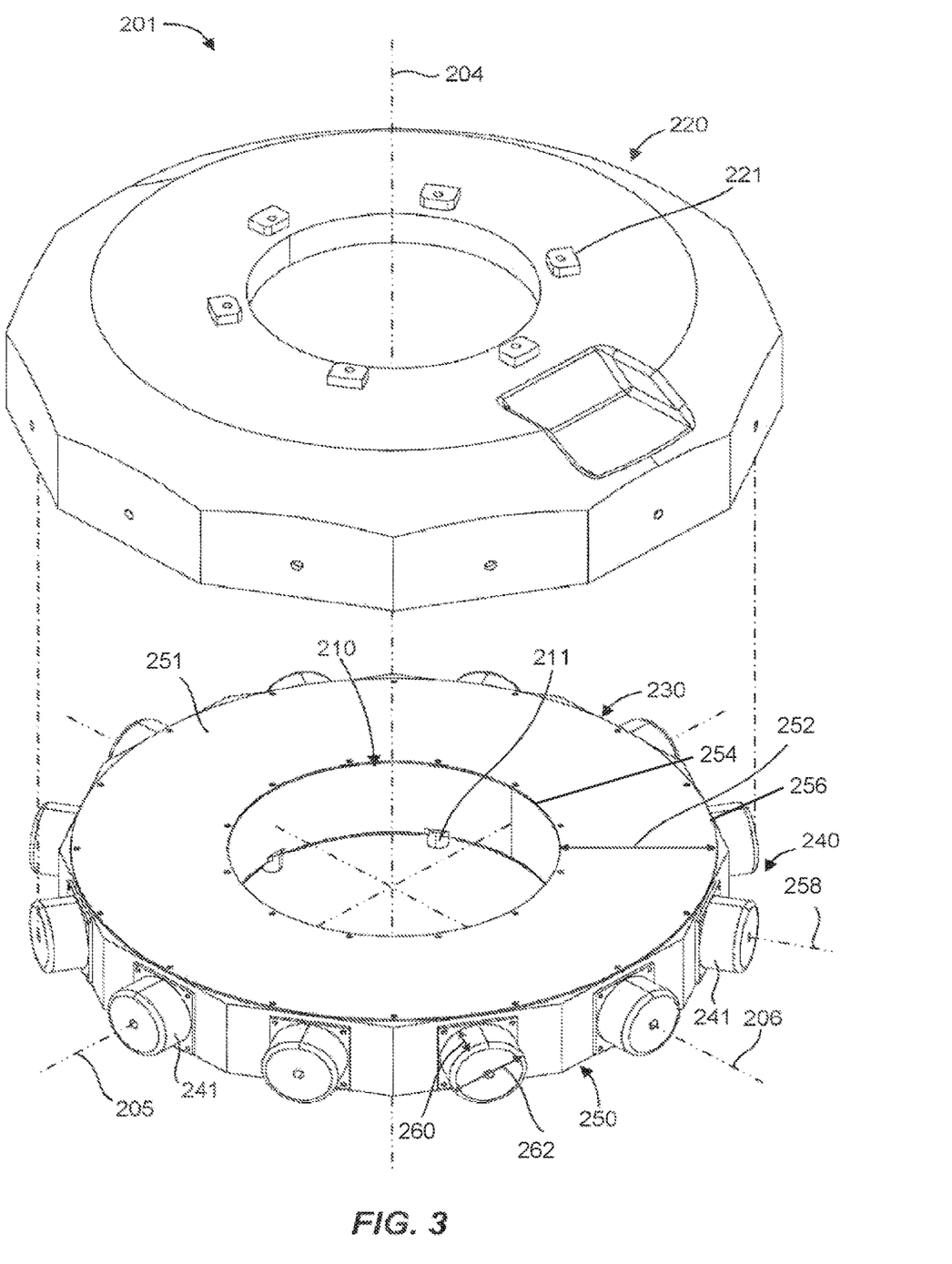
FIG. 3 is a partially exploded view of the vibration isolator of FIG. 2A showing a first mount that is configured to cover the axial flexural support and the lateral elastomeric support.

Referring in addition to FIG. 3, the axial flexural support 230 is configured to provide axial compliance in a direction that is parallel to the central axis 204. As shown in FIG. 3, the axial flexural support 230 may include at least one other flexure 251 in addition to the flexure 231 shown in FIG. 2B. The flexures 231, 251 may have a flat ring configuration. In other exemplary embodiments, one or more flexures 231, 251 may include multiple flexural components that are arranged in a common plane, such as three flexural components spaced about the central axis 204 relative to each other. In other exemplary embodiments, the axial flexural support 230 includes two parallel flexures 231, 251 that are offset along the central axis 204. The axial flexural support 230 may include flexures or springs having any suitable configuration, such as the planar or plate flexure configuration shown in FIGS. 2B-4.

Axial compliance of the axial flexural support 230 is achieved by selecting any suitable geometry or dimensions of the flexure 231, 251 depending on the application. For example, a width 252 and thickness of the flexure 231, 251 may be tunable or adjustable. The width 252 may be defined by the flexure 231, 251 extending radially from an inner diameter 254 arranged proximate the first mount 210 to an outer diameter 256 arranged proximate the intermediate support 250 and the elastomeric structures 241 of the lateral elastomeric support 240. The flexures 231, 251 may also be tuned or adjusted by changing material properties, the number or arrangement of the flexures 231, 251, the shape of the flexures 231, 251, or other components that may be added to the flexures 231, 251. For example, the flexures 231, 251 may be arranged on opposing axial sides of the intermediate support 250 and the elastomeric structures 241, and variable numbers of the flexures 231, 251 may be stacked on each side.

The lateral elastomeric support 240 is configured to provide lateral compliance relative to the central axis 204, such as in a lateral direction along the axes 205, 206. The axes 205, 206 may be orthogonal to the axis 204, and may also be orthogonal to each other. The lateral elastomeric support 240 may be configured to provide lateral compliance in the two lateral axes 205, 206 or other directions orthogonal to the central axis 204. The lateral elastomeric support 240 may be configured to provide radial compliance relative to the central axis 204.

The elastomeric structures 241 may have any suitable shape or geometry configuration, such as at least one of a cylindrical configuration or a cuboid configuration. In exemplary embodiments, the elastomeric structure 241 may define a longitudinal axis 258 that is oriented orthogonal to the central axis 204. Lateral or radial compliance and/or tuned or desired damping of the lateral elastomeric support 240 is achieved by selecting suitable geometries or dimensions of the elastomeric structures 241, selecting a suitable elastomeric material for the elastomeric structures 241, selecting a suitable number or arrangement of the elastomeric structures 241, etc. For example, a length 260 or diameter 262 of an elastomeric structure 241 may be adjusted as required for a particular location. All of the elastomeric structures 241 may be identical in shape and size. In other exemplary embodiments, the elastomeric structures 241 may have different shapes and sizes.

Figure 4:
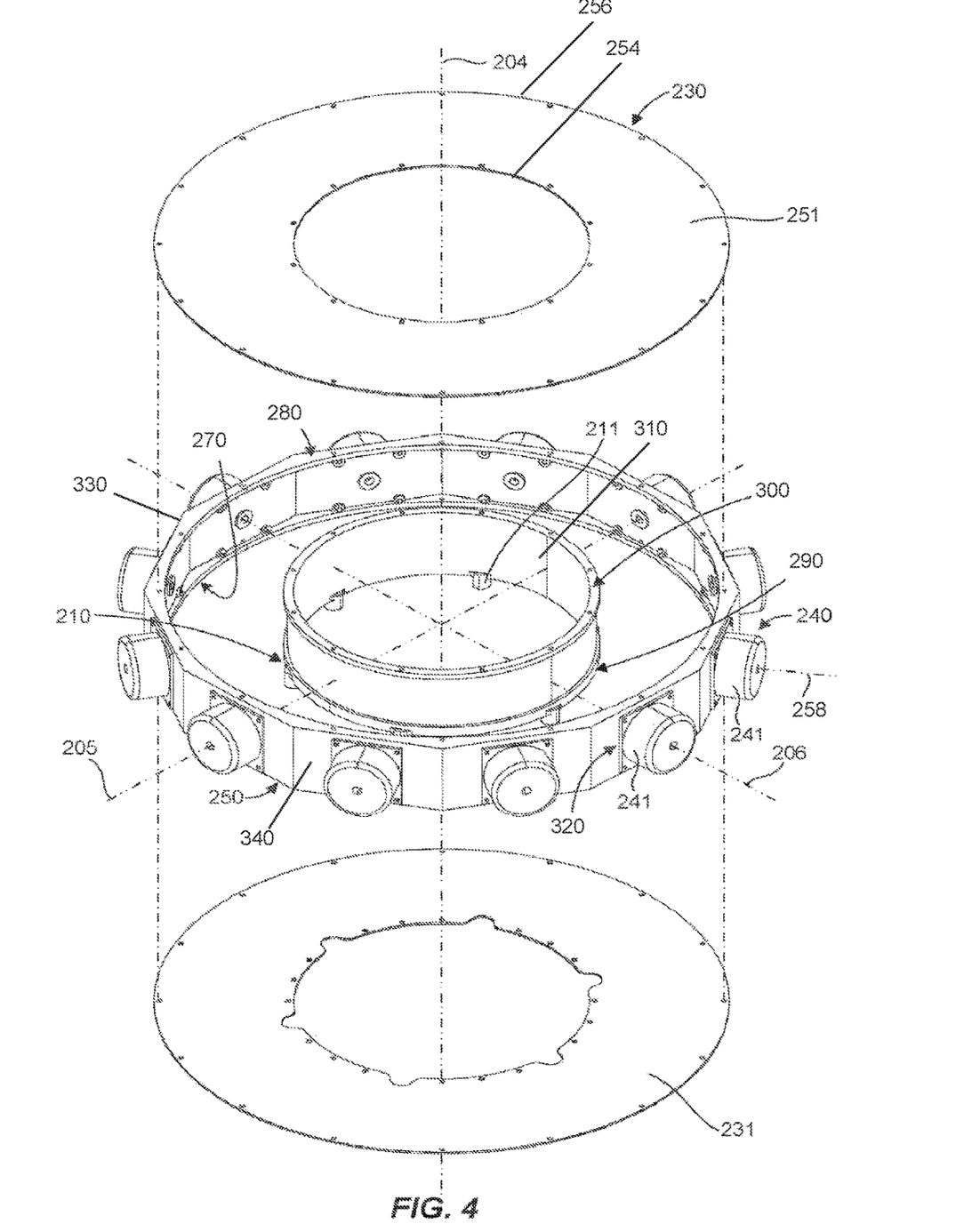
FIG. 4 is another partially exploded view of the vibration isolator of FIG. 2A showing a second mount and an intermediate support that support the axial flexural support and the lateral elastomeric support.

As best shown in FIG. 4, the intermediate support 250 may include one or more flexure support interfaces 270, 280 configured to interface with the flexures 231, 251 of the axial flexural support 230. The flexure support interfaces 270, 280 may be formed as rims or border edges of the ring-shaped intermediate support 250. At least a portion of a corresponding flexure 231, 251 may be configured to axially engage against one of the flexure support interfaces 270, 280.

The first mount 210 may include one or more flexure support interfaces 290, 300 configured to interface with the flexures 231, 251. The flexure support interfaces 290, 300 may be formed as rims or border edges of the first mount 210. The first mount 210 may include an axial sleeve 310 that extends between the flexure support interfaces 290, 300. The flexure 251 may be supported against the flexure support interface 300 of the first mount 210 and the flexure support interface 280 of the intermediate support 250. Any suitable fasteners or adjoining methods may be used to secure the flexures 231, 251 to the flexure support interfaces 270, 280, 290, 300, such as bolts, clamps, interlocking mechanisms, snap connections, welding, etc.

The first mount 210 and the intermediate support 250 may be axially interposed between the flexures 231, 251. The intermediate support 250 may be arranged to radially surround the first mount 210, and the intermediate support 250 may be radially spaced from the first mount 210. The intermediate support 250 and the first mount 210 may be concentrically arranged about the central axis 204. When assembled, the inner diameter 254 of the flexure 251 may engage against the flexure support interface 300 of the first mount 210 and the outer diameter 256 of the flexure 251 may engage against the flexure support interface 280 of the intermediate support 250.

The intermediate support 250 may include one or more elastomeric support interfaces 320 that are configured to interface with the elastomeric structures 241 of the lateral elastomeric support 240. The elastomeric support interfaces 320 may be disposed on an outer periphery 330 of the intermediate support 250. In an exemplary embodiment, the intermediate support 250 may include a continuous ring body 340 that is formed of a plurality of connected planar surfaces to which the elastomeric support interfaces 320 are attached. The elastomeric support interfaces 320 may be formed as planar panels from which the elastomeric structures 241 protrude outwardly from relative to the central axis 204. The elastomeric support interfaces 320 may have any suitable shape and the shape may be dependent on the shape of the corresponding elastomeric structures 241.

The axial flexural support 230 and the lateral elastomeric support 240 may be configured to provide stiffness about the central axis 204. For example, the geometry of the flexures 231, 251 may provide stiffness or rigidity about the central axis 204. In addition, the elastomeric structures 241 may be configured to provide stiffness or rigidity about the central axis 204 based on the geometry or dimensions, elastomeric material properties, number of elastomeric structures 241, etc.

The vibration isolator 201 is advantageous in achieving tunable translational compliance and/or damping in the axial and lateral directions through bending of the flexures 231, 251 and deflection of the elastomeric structures 241, while maintaining rotational stiffness about the central axis 204. Compliance, damping, and/or stiffness of the axial flexural support 230 and/or the lateral elastomeric support 240 in the desired axis or direction may be tuned by changing geometry, dimensions, material, quantity, etc. to achieve a desired performance objective. The compliance, damping, and/or stiffness of the axial flexural support 230 and the lateral elastomeric support 240 may be tuned to substantially decouple axial and lateral structural modes.

Figure 5:
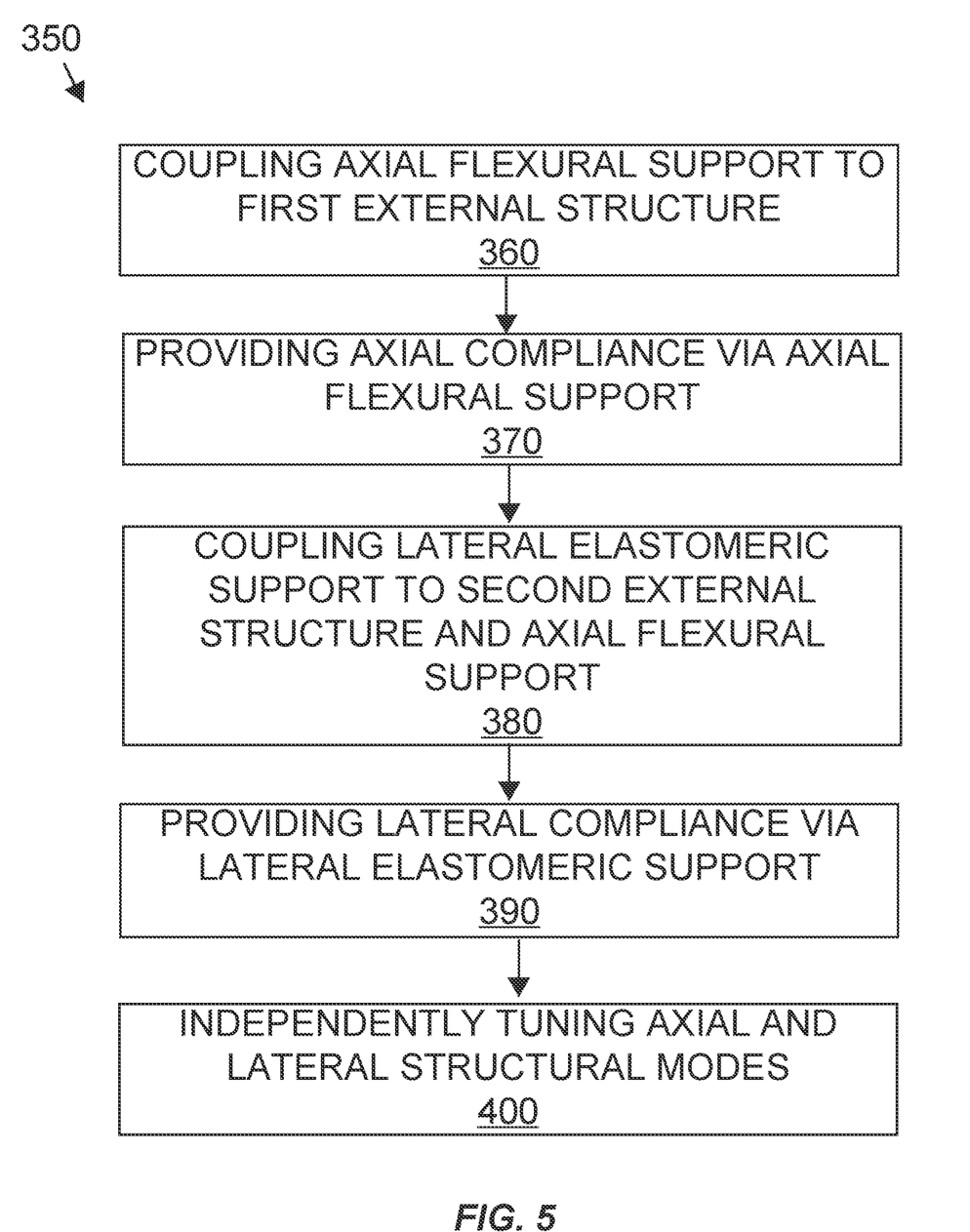
FIG. 5 is a flowchart showing a method of minimizing propagation of vibrations between a first and second external structure using a vibration isolator, such as the vibration isolator shown in FIGS. 1-4.

Referring now to FIG. 5, a flowchart showing a method 350 of minimizing propagations of vibrations between a first external structure and a second external structure arranged along a central axis is shown. The method 350 may be used with the first and second external structures 102, 103 of FIG. 1, and the method 350 may include the vibration isolator 101, 201 shown in FIGS. 2A-4. Step 360 of the method 350 include coupling an axial flexural support 230 to the first external structure. Step 370 of the method 350 includes providing axial compliance via the axial flexural support 230 in a direction that is parallel to the central axis 204.

Step 380 of the method 350 includes coupling a lateral elastomeric support 240 to the second external structure and the axial flexural support 230. Step 390 of the method 350 includes providing lateral compliance relative to the central axis 206 via the lateral elastomeric support 240. The axial flexural support 230 and the lateral elastomeric support 240 are configured to provide stiffness about the central axis 204. Step 400 of the method 350 includes independently tuning axial structural modes and lateral structural modes via the axial flexural support 230 and the lateral elastomeric support 240 enabling the axial structural modes and the lateral structural modes to be decoupled from each other. The modes may be tuned to meet the requirements of a particular application.

Any suitable manufacturing methods and materials may be used to form and assemble the components of the vibration isolator 101, 201 shown in FIGS. 1-4. Exemplary methods include molding, casting, welding, brazing, etc. Additive manufacturing may be used, or a combination of conventional manufacturing processes and additive manufacturing methods may be used. The shapes of the flexures, elastomeric structures, and support structures may be dependent on the application and the manufacturing methods may be dependent on the desired shapes.

Although the disclosure includes certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A vibration isolator configured to couple a first external structure and a second external structure arranged along a central axis to minimise propagation of vibrations between the first and second external structure, the vibration isolator comprising:
    an axial flexural support that is configured to be coupled to the first external structure and provide axial compliance parallel to the central axis; and
    a lateral elastomeric support that is configured to be coupled to the second external structure and the axial flexural support, the lateral elastomeric support being configured to provide stiffness about the central axis, and axial structural modes and lateral structural modes that are independent and decoupled from each other;
    wherein the axial flexural support includes at least one plate flexure that is ring-shaped.

2. The vibration isolator of claim 1, wherein the at least one flexure includes two or more parallel flexures that are offset along the central axis.

3. The vibration isolator of claim 1, wherein the lateral elastomeric support includes at least one elastomeric structure.

4. The vibration isolator of claim 3, wherein the at least one elastomeric structure extends along a longitudinal axis that is oriented orthogonal to the central axis.

5. The vibration isolator of claim 3, wherein the at least one elastomeric structure has a symmetrical shape.

6. The vibration isolator of claim 3, wherein the at least one elastomeric structure includes a plurality of elastomeric structures that are arranged in a symmetrical pattern about the central axis.

7. The vibration isolator of claim 1, further comprising an intermediate support that is arranged along the central axis and configured to couple the axial flexural support and the lateral elastomeric support to each another.

8. The vibration isolator of claim 7, wherein the lateral elastomeric support includes a plurality of elastomeric protrusions that protrude from an outer periphery of the intermediate support.

9. The vibration isolator of claim 7, wherein the intermediate support includes one or more elastomeric support interfaces that are configured to interface with the lateral elastomeric support, and one or more flexure support interfaces that are configured to interface with the axial flexural support.

10. The vibration isolator of claim 1, wherein the lateral elastomeric support is configured to provide lateral compliance in two lateral axes that are orthogonal to the central axis.

11. The vibration isolator of claim 1, wherein the axial flexural support is configured to provide lateral stiffness orthogonal to the central axis, and wherein the lateral elastomeric support is configured to provide axial stiffness parallel to the central axis.

12. The vibration isolator of claim 1, further comprising a first mount configured to couple the first external structure and the axial flexural support, and a second mount configured to couple the second external structure and the lateral elastomeric support.

13. The vibration isolator of claim 12, wherein the first mount includes one or more axial flexural support interfaces that are configured to interface with the axial flexural support, and wherein the second mount includes one or more lateral elastomeric support interfaces that are configured to interface with the lateral elastomeric support.

14. A vibration isolator configured to couple a first external structure and a second external structure arranged along a central axis to minimize propagation of vibrations between the first and second external structure, the vibration isolator comprising:
    an axial flexural support that is configured to be coupled to the first external structure and provide axial compliance parallel to the central axis;
    a lateral elastomeric support that is configured to be coupled to the second external structure and the axial flexural support, the lateral elastomeric support being configured to provide lateral compliance relative to the central axis, the axial flexural support and the lateral elastomeric support being configured to provide stiffness about the central axis, and axial structure modes and lateral structural modes that are independent and decoupled from each other; and an intermediate support that is arranged along the central axis and configured to couple the axial flexural support and the lateral elastomeric support to each other;

wherein the lateral elastomeric support includes a plurality of elastomeric protrusions that protrude from an outer periphery of the intermediate support; and wherein the axial flexural support includes plate flexures, wherein the intermediate support and the plurality of elastomeric protrusions are axially interposed between the plate flexures along the central axis.

15. The vibration isolator of claim 14, wherein the axial flexural support includes at least one plate flexure that is ring-shaped.

16. A vibration isolator configured to couple a first external structure and a second external structure arranged along a central axis to minimize propagation of vibrations between the first and second external structure the vibration isolator comprising:

an axial flexural support that is configured to be coupled to the first external structure and provide axial compliance parallel to the central axis;

a lateral elastomeric support that is configured to be coupled to the second external structure and the axial flexural support, the lateral elastomeric support being configured to provide lateral compliance relative to the central axis, the axial flexural support and the lateral elastomeric support being configured to provide stiffness about the central axis, and axial structural modes and lateral structural modes that are independent and decoupled from each other; and a first mount configured to couple the first external structure and the axial flexural support, and a second mount configured to couple the second external structure and the lateral elastomeric support;

wherein the second mount is a housing configured to cover at least a portion of the axial flexural support and the lateral elastomeric support.

17. The vibration isolator of claim 16, wherein the axial flexural support includes at least one plate flexure that is ring-shaped.

18. The vibration isolator of claim 16, further comprising an intermediate support that is arranged along the central axis and configured to couple the axial flexural support and the lateral elastomeric support to each another.

19. The vibration isolator of claim 16, wherein the lateral elastomeric support includes a plurality of elastomeric protrusions that protrude from an outer periphery of the intermediate support.

20. A vibration isolator comprising: a first external structure arranged along a central axis;

a second external structure arranged along the central axis;

a vibration isolator configured to couple the first external structure and the second external structure to minimize propagation of vibrations between the first and second external structure, the vibration isolator comprising:

a first mount configured to be coupled to the first external structure;

a second mount configured to be coupled to the second external structure;

an axial flexural support that is configured to be coupled to the first mount and provide axial compliance parallel to the central axis; and a lateral elastomeric support that is configured to be coupled to a second mount and the axial flexural support, the lateral elastomeric support being configured to provide lateral compliance relative to the central axis, the axial flexural support and the lateral elastomeric support being configured to provide stiffness about the central axis, and axial structural modes and lateral structural modes that are independent and decoupled from each other;

wherein the first external structure is a turret and the second external structure is a support structure for the turret.

* * * * *